United States Patent [19]
Mutoh et al.

[11] Patent Number: 4,855,381
[45] Date of Patent: Aug. 8, 1989

[54] METHOD FOR THE PREPARATION OF AN ORGANOPOLYSILOXANE

[75] Inventors: Kiyoyuki Mutoh; Kazushi Satoh; Kouichirou Kobayashi, all of Annaka, Japan

[73] Assignee: Shin-Etsu Chemical Co., Ltd., Tokyo, Japan

[21] Appl. No.: 201,156

[22] Filed: Jun. 2, 1988

[30] Foreign Application Priority Data

Jun. 3, 1987 [JP] Japan ................. 62-139114

[51] Int. Cl.$^4$ ............................................. C08G 77/06
[52] U.S. Cl. ........................................ 528/23; 528/21; 528/39; 556/450; 556/453; 556/462
[58] Field of Search ............................ 528/21, 23, 39; 556/462, 450, 453

[56] References Cited

U.S. PATENT DOCUMENTS

| | | | |
|---|---|---|---|
| 4,460,726 | 7/1984 | Huber et al. | 528/23 |
| 4,608,412 | 8/1986 | Freiberg | 524/788 |
| 4,774,310 | 9/1988 | Butler | 528/23 |

Primary Examiner—Melvyn I. Marquis
Attorney, Agent, or Firm—Millen, White & Zelano

[57] ABSTRACT

An organopolysiloxane composed of tetrafuctional siloxane units $SiO_2$ and monofunctional siloxane units $R_3SiO_{0.5}$ can be prepared by reacting an alkyl orthosilicate, e.g., ethyl silicate, or a partial hydrolysis product thereof and an oligomeric organopolysiloxane containing the monofunctional siloxane units in the presence of a catalytic compound which is, different from conventional hydrogen chloride, selected from the group consisting of sulfonic acid group-containing compounds, e.g., sulfuric acid and p-toluene sulfonic acid, and phosphonitrile chloride. In particular, cation exchange resins of sulfonic acid type and fluorinated polysulfonic acid resins can be used as the catalyst in a continuous process in which the reaction mixture is passed through a bed of the catalyst continuously. The inventive method is advantageous over conventional methods because of the absence of the problems of heavy corrosion of the apparatuses and waste disposal due to the hydrogen chloride.

13 Claims, No Drawings

METHOD FOR THE PREPARATION OF AN ORGANOPOLYSILOXANE

BACKGROUND OF THE INVENTION

The present invention relates to a method for the preparation of an organopolysiloxane or, more particularly, to a method for the preparation of an organopolysiloxane containing tetrafunctional siloxane units of the formula $SiO_2$, of which the content of the $SiO_2$ units relative to other types of the siloxane units can be well controlled to be the same as in the mixture of the starting low-molecular organosilicon compounds, without the addition of any ordinary acidic or alkaline material as a catalyst and an alcohol and further without undertaking troublesome disposal treatments of waste liquids containing acids and alcohols.

As is known, organopolysiloxanes composed of monofunctional siloxane units represented by the general formula $R_3SiO_{\frac{1}{2}}$, in which R is a hydrogen atom or a monovalent hydrocarbon group, referred to as the M units hereinbelow, and the tetrafunctional siloxane units of the formula $SiO_2$, referred to as the Q units hereinbelow, which soluble in various organic solvents such as benzene, are widely used in many applications in the art of silicones. A typical method in the prior art for the preparation of such an organopolysiloxane composed of the M and Q units it that a water-soluble basic silicate such as water glass, sodium orthosilicate and the like is converted into an oilgomer of silicic acid by the addition of a strong acid such as hydrochloric and sulfuric acids followed by the reaction with a triorgano monochlorosilane according to the disclosure in U.S. Pat. No. 2,676,182 and U.S. Pat. No. 2,814,601.

This method, however, has several problems, viz., the molecular weight distribution of the organopolysiloxane product can hardly be controlled because of the instability of the oilgomeric organopolysiloxane as the intermediate, the molar proportion of the M units and Q units in the organopolysiloxane product may sometimes be deviated from the target value as desired notwithstanding careful formulation of the starting materials, and the waste water discharged from the process must be disposed with large costs because it contains a large amount of the acid used for the neutralization as well as the hydrochloric acid produced as a by-product from the trialkyl monochlorosilane as well as a large amount of the alcohol added to the reaction mixture with an object of stabilization of the reaction mixture. In particular, hydrochloric acid or hydrogen chloride gas therefrom is not only harmful to the human body and has a very unpleasant irritating odor but also is extremely corrosive against metal-made parts in the manufacturing apparatuses, pipings and accessary equipments necessitating a great expense for the apparatuses and equipments made of corrosion-resistant but very expensive materials as well as maintenance thereof with a great deal of labor and material.

Alternatively, different methods are known for the preparation of the organopolysiloxanes composed of the M and Q units including the method disclosed in U.S. Pat. No. 2,857,356 in which an alkyl silicate and a trialkyl monochlorosilane are cohydrolyzed in the presence of hydrochloric acid and a method disclosed in Japanese Patent Kokai No. 61-195129 in which an alkyl silicate or a partial hydrolysis product thereof is added dropwise to a hexaalkyl disiloxane or a trialkyl monochlorosilane in the presence of aqueous hydrochloric acid. These methods are more advantageous than the first mentioned method in respect of the relatively easy control of the molar proportion of the M and Q units and the molecular weight distribution in the product. On the contrary, these methods are very disadvantageous in respect of environmental pollution and waste disposal because the reaction mixture is admixed with a large amount of hydrochloric acid or a large amount of hydrogen chloride is produced in the course of the reaction and a large amount of an alcohol is produced in the reaction mixture from the starting materials or the reaction mixture must be admixed with an alcohol so that the problems relative to the waste disposal and prevention of damages by the hydrochloric acid are as serious as in the first mentioned method.

Thus, each of the above described prior art methods has problems and disadvantages that a very expensive process of waste disposal is indispendable, that the efficiency of production is relatively low with a low yield of the organopolysiloxane product per unit volume of the reaction vessel as a consequence of a large volume of organic solvents as an auxiliary material in the hydrolysis, that difficulties are encountered in the control of the reaction when the desired organopolysiloxane product contains the M units in a relatively large proportion or, in particular, with the molar ratio of M units/Q units of 2 or larger, than an organopolysiloxane having a specific target values of the M units/Q units molar ratio and the molecular weight distribution can hardly be obtained, and that organopolysiloxane resins having silanol groups and alkoxy groups can hardly be manufactured with good reproducibility.

SUMMARY OF THE INVENTION

The present invention accordingly has an object to provide a novel and improved method for the preparation of an organopolysiloxane containing tetrafunctional siloxane units $SiO_2$ or, in particular, an organopolysiloxane composed of the tetrafunctional siloxane units, i.e. Q units, and monofunctional siloxane units, i.e. M units, without the problems and disadvantages in the above described prior art methods.

Thus, the method of the present invention for the preparation of an organopolysiloxane containing tetrafunctional siloxane units or composed of tetrafunctional siloxane units and monofunctional siloxane units comprises:

reacting an alkyl orthosilicate or a partial hydrolysis product thereof with an oligomeric organopolysiloxane having a siloxane unit represented by the unit formula $R_aSiO_{(4-a)/2}$, in which R is a hydrogen atom or a monovalent hydrocarbon group, and a is 1, 2 or 3, in the presence of a catalytic compound selected from the group consisting of sulfonic acid group-containing compounds and phosphonitrile chlorides. In particular, the above mentioned sulfonic acid group-containing compound is preferably a solid acid.

When the desired organopolysiloxane product should be composed of the tetrafunctional siloxane units and monofunctional siloxane units along, it is preferably that the alkyl orthosilicate or a partial hydrolysis product thereof is reacted with a corresponding disiloxane compound such as hexamethyl disiloxane, tetramethyl divinyl disiloxane, tetramethyl disiloxane and the like. When the product organopolysiloxane should contain difunctional siloxane units, the starting reaction mixture should of course contain an organopolysiloxane oligomer containing difunctional units such as octamethyl cyclotetrasiloxane, decamethyl tetrasiloxane and the like.

DETAILED DESCRIPTION OF THE PREFERRED EMBODIMENTS

The above summarized method of the present invention is characterized by the use of a specific catalyst to promote the reaction between an alkyl orthosilicate or a partial hydrolysis product thereof, which serves as the source material of the tetrafunctional siloxane units, and an organopolysiloxane oligomer to serve as the source material of the siloxane units other than the tetrafunctional units.

The use of the particular catalytic compound gives advantages that the molar ratio of the M units to the Q units and the molecular weight distribution in the organopolysiloxane product can easily be controlled and the problems of troublesome waste disposal and corrosion of the equipment can be almost completely solved because no hydrogen chloride is produced as a by-product in the course of the process and addition of alcohols to the reaction mixture is not required in performing the reaction.

One of the starting reactant materials in the inventive method is an oligomeric organopolysiloxane having, in a molecule, at least one organosiloxane unit represented by the unit formula $R_aSiO_{(4-a)/2}$, in which R is a hydrogen atom or a monovalent hydrocarbon group exemplified by alkyl groups such as methyl, ethyl, propyl and butyl groups, alkenyl groups such as vinyl and allyl groups, cycloalkyl groups such as cyclohexyl group and aryl groups such as phenyl and tolyl groups as well as substituted monovalent hydrocarbon groups obtained by replacing a part or all of the hydrogen atoms in the above named hydrocarbon groups with halogen atoms, cyano groups and the like such as chloromethyl, 3,3,3-trifluoropropyl and cyanoethyl groups, and the subscript a in the formula is 1, 2 or 3.

Examples of the above defined oligomeric organopolysiloxane compound include hexamethyl disiloxane, 1,1,3,3-tetramethyl disiloxane, 1,3-divinyl-1,1,3,3-tetramethyl disiloxane and octamethyl cyclotetrasiloxane through not particularly limited thereto. These oligmeric organopolysiloxane compounds can be used as a combination of two kinds or more according to need.

The other reactant material to be reacted with the above described oligomeric organopolysiloxane compound is an alkyl orthosilicate or a partial hydrolysis product thereof exemplified by tetramethyl silicate, polymethyl silicate, tetraethyl silicate, polyethyl silicate, tetrapropyl silicate, polypropyl silicate and the like as well as partial hydrolysis products thereof. The amount of these alkyl silicates or partial hydrolysis products thereof in the reaction mixture relative to the oligomeric organopolysiloxane compounds should be adequately selected depending on the desired molar ratio of the M units and Q units as well as the desired molecular weight distribution in the organopolysiloxane product.

In the method of the present invention, the reaction between the oligomeric organopolysiloxane compound and the alkyl orthosilicate or a partial hydrolysis product thereof is promoted by a catalytic compound selected from the group consisting of sulfonic acid group-containing compounds and phosphonitrile compounds. Suitable sulfonic acid group-containing compounds include sulfuric acid, sulfurous acid, fuming sulfuric acid, p-toluene sulfonic acid, acid clay trifluoromethane sulfonic acid, sodium hydrogen sulfate and the like. The amount of these catalytic compounds added to the reaction mixture can be much smaller than the amount of hydrochloric acid conventionally used as the catalyst. A sufficiently high catalytic effect can usually be obtained by the addition of the catalytic compound in an amount in the range from 0.001 to 3% by weight based on the overall amount of the above described oligomeric organopolysiloxane compound and the alkyl orthosilicate or a partial hydrolysis product thereof.

The method of the invention by using the above named catalytic compound is performed by mixing the above described oligomeric organopolysiloxane compound and the alkyl orthosilicate or a partial hydrolysis product thereof in a calculated proportion together with the catalytic compound. The reaction temperature is in the range from $-30°$ C. to $+200°$ C. or, preferably, from $-20°$ C. to $+100°$ C. It is preferable that the reaction is performed in the presence of a small amount of water although the reaction proceeds in the absence of water. The amount of water added to the reaction mixture is preferably in the range from 0.6 to 1.5 moles per mole of the alkoxy groups in the alkyl orthosilicate or a partial hydrolysis product thereof as the starting reactant. When the amount of the added water is too small, an unduly large amount of the alkoxy groups may remain unreacted. When the amount of the added water is too large, on the other hand, the influence on the amounts of the residual alkoxy groups and hydroxy groups as well as on the molecular weight may be descreased although these parameters are influenced also by the reaction temperature and reaction time in addition to the amount of added water. If desired, the reaction mixture can be admixed with an organic solvent.

Among the above named catalytic compounds used in the inventive method, a particularly preferable class of the sulfonic acid group-containing compounds includes so-called solid acid catalysts exemplified by MR (macroreticular) type cation exchange resins, fluorinated polysulfonic acid resins sold under tradenames of Nafions such as Nafion type NR50 which is a copolymer of tetrafluoroethylene and perfluoro-3,6-dioxa-4-methyl-7-octene-sulfonyl fluoride as hydrolysed in the H+ form according to the manufacturer E. I. DuPont Co. and the like. These catalysts can be used in any of batich-wise processes and continuous processes using a packed tower filled with the catalyst. When the inventive method is practiced as a batch-wise process, the amount of the catalyst added to the reaction mixture is desirably at least 5% by weight based on the overall amount of the oligomeric organopolysiloxane compound and the alkyl orthosilicate or a partial hydrolysis product thereof in order to obtain a practically desirable reaction velocity. When the inventive method is practiced as a continuous process, the reaction mixture is passed through a packed tower filled with the catalyst at an appropriate velocity.

The reaction of the inventive method proceeds in the reaction mixture composed of the oligomeric organopolysiloxane compound and the alkyl orthosilicate or a partial hydrolysis product thereof in the presence of the above mentioned catalyst, preferably, in the form of a solid with admixture of water. The reaction mixture is optionally admixed with an organic solvent such as methyl alcohol, ethyl alcohol, isopropyl alcohol, acetone, methyl ethyl ketone, methyl isobutyl ketone and the like with an object to compensate the viscosity increase taking place as the reaction proceeds and to increase the miscibility of the ingredients in the reaction mixture.

When the above mentioned sulfonic acid group-containing solid acid catalyst is used, the reaction temperature is also in the range from $-30°$ C. to $+200°$ C. It should be noted, however, that some of the catalysts of this class have a somewhat low heat-resistant temperature. For example, the reaction temperature when a cation exchange resin such as Amberlyst 15 (a product by Rohm & Hass Co.) is used as the catalyst should be in the range from $-20°$ C. to $+120°$ C. while the reaction using a Nafion can be performed at a temperature in the range from $-20°$ C. to $+200°$ C. The characteristic parameters of the organopolysiloxane product such as the contents of alkoxy groups and hydroxy groups and molecular weight can be easily controlled by means of the feeding velocity of the starting reactants, amount of the added water in the reaction mixture, addition of a miscible organic solvent, reaction temperature and the like. The amount of water added to the reaction mixture is usually in the range from 0.6 to 3.0 moles per mole of the alkoxy groups in the alkyl orthosilicate or a partial hydrolysis product thereof in order that almost all of the alkoxy groups therein are brought into the hydrolysis and condensation reactions.

When the oligomeric organopolysiloxane and the alkyl orthosilicate or a partial hydrolysis product thereof as the reactants are reacted according to the inventive method by using the specific catalytic compound, the molar ratio of the M units to the Q units in the product organopolysiloxane coincides with that in the starting reaction mixture formulated with the reactants. The yield of the product organopolysiloxane is much larger than in the conventional methods with little loss of the M units. Moreover, the amounts of residual alkoxy groups and hydroxy groups and molecular weight distribution in the product organopolysiloxane can be controlled by adequately selecting the reaction conditions such as the amount of the alkyl orthosilicate or a partial hydrolysis product thereof relative to the oligomeric organopolysiloxane, amounts of water and the catalyst added to the reaction mixture, reaction temperature and reaction time so that various types of organopolysiloxane products can be prepared easily and reproducibly. In addition, the method of the invention is also advantageous because no hydrochloric acid is produced in the reaction mixture as a by-product and no alcohol need not be added to the reaction mixture so that the apparatuses used for practicing the inventive method are freed from the problem of corrosion by the hydrochloric acid and the waste materials from the process can be easily disposed without particular difficulties.

In the following, the method of the present invention is described in more detail by way of examples.

EXAMPLE 1.

A reaction mixture was prepared by mixing 162.4 g (1.0 mole) of hexamethyl disiloxane and 150.0 g of a partial hydrolysis product of ethyl silicate with a $SiO_2$ content of 40% (Ethyl Silicate 40, a product of Tama Kagaku Kogyo Co.) corresponding to 1.0 mole of $SiO_2$ units, with addition of 2 g of a 98% concentrated sulfuric acid. The reaction mixture was kept at a temperature of 0 to 20° C. and 24 g of water were added thereto dropwise over a period of 1 hour under agitation. After 1 hour from completion of the dropwise addition of water, a 16 g portion of water was additionally added to the reaction mixture which was then heated under reflux at about 80° C. for 5 hours with agitation. The sulfuric acid in the reaction mixture was neutralized with sodium hydrogen carbonate to give a solution of product organopolysiloxane in ethyl alcohol. The solvent in the mixture was replaced with toluene and the mixture was filtered to give a toluene solution of the organopolysiloxane in a concentration of 50% by weight containing 211 g of the organopolysiloxane. The yield was about 95% of the theoretical value.

The analysis of the organopolysiloxane product for the molar ratio of the siloxane units was undertaken to find that the M units, i.e. $(CH_3)_3SiO_{0.5}$ units, and the Q units, i.e. $SiO_2$ units, were contained in a molar ratio of 2:1.

EXAMPLE 2.

A reaction mixture was prepared by mixing 46.6 g (0.25 mole) of 1,3-divinyl-1,1,3,3-tetramethyl disiloxane, 40.6 g (0.25 mole) of hexamethyl disiloxane and 150 g of the same partial hydrolysis product of ethyl silicate as used in Example 1 with addition of 5 g of p-toluene sulfonic acid. The mixture was kept at a temperature of 0 to 15° C. and 9 g of water were added thereto dropwise over a period of 1 hours under agitation. After 1 hour from completion of the dropwise addition of water, a 35 g portion of water was additionally added to the mixture followed by a post-treatment in about the same manner as in Example 1 to give an organopolysiloxane in an amount of 134.5 g as a product. The yield was about 91% of the theoretical value.

Analysis of this product gave a result that the organopolysiloxane product was composed of $CH_2$=CH) $(CH_3)_2SiO_{0.5}$ units, $(CH_3)_3SiO_{0.5}$ units and $SiO_2$ units in a molar ratio of 0.5:0.5:1.

EXAMPLE 3.

A reaction mixture composed of 324.8 g (2.0 moles) of hexamethyl disiloxane and 152.2 g (1.0 mole) of methyl silicate with addition of 4.0 g of a 98% concentrated sulfuric acid was kept at 0 to 10° C. and 45 g (2.5 moles) of water were added dropwise under agitation to the mixture kept at 0 to 15° C. over a period of 1 hour followed by further continued agitation for 5 hours at a temperature of 20° to 30° C. Thereafter, the mixture was washed repeatedly with water to neutrality and filtered to give 363 g of an organopolysiloxane as the product. The yield was about 94% of the theoretical value.

Analysis of this product gave a result that the organopolysiloxane was composed of the $(CH_3)_3SiO_{0.5}$ units and $SiO_2$ units in a molar ratio of 4.0:1.0.

EXAMPLE 4.

A reaction mixture composed of 142.0 g (1.0 mole) of 1,1,3,3-tetramethyl disiloxane, 208 g of ethyl silicate and 150 g of the same partial hydrolysis product of ethyl silicate as used in Example 1 with addition of 5 g of p-toluene sulfonic acid was kept at 0 to 20° C. and 40 g of water were added dropwise thereto under agitation over a period of 1 hour. After 1 hour from completion of the dropwise addition of water, a 110 g portion of water was additionally added to the mixture which was further agitated for 5 hours at 30° C. Thereafter, the mixture was neutralized by adding 3.0 g of sodium carbonate and the solvent was replaced with toluene followed by filtration to give 196 g of an organopolysilixane as the product. The yield was about 97% of the theoretical value.

Analysis of this product gave a result that the organopolysiloxane was composed of the $H(CH_3)_2SiO_{0.5}$ units and $SiO_2$ units in a molar ratio of 2.0:1.0.

EXAMPLE 5.

A reaction mixture composed of 155.3 g (0.5 mole) of decamethyl tetrasiloxane and 150 g of the same partial hydrolysis product of ethyl silicate as used in Example 1 corresponding to 1.0 mole of the $SiO_2$ units with addition of 5 g of a 98% concentrated sulfuric acid was kept at 0° to 10° C. and 26 g of water were added dropwise thereto under agitation over a period of 1 hour. After 3 hours from completion of the dropwise addition of water, a 105 g portion of water was added to the mixture which was then heated under reflux for 5 hours with agitation and neutralized by adding 8.6 g of sodium carbonate followed by replacement of the solvent with toluene and filtration to give 202 g of an organopolysiloxane as the product. The yield was about 94% of the theoretical value.

Analysis of the product gave a result that the organopolysiloxane was composed of the $(CH_3)_3Si$—$O$—$Si(CH_3)_2O_{0.5}$ units and $SiO_2$ units in a molar ratio of 1:1.

EXAMPLE 6.

A reaction mixture was prepared by mixing 35.5 g (0.25 mole) of 1,1,3,3-tetramethyl disiloxane, 41 g (0.25 mole) of hexamethyl disiloxane and 117.6 g of a partial hydrolysis product of methyl silicate of which the content of $SiO_2$ was 51% (Methyl Silicate 51, a product of Tama Kagaku Kogyo Co.) corresponding to 1.0 mole of the $SiO_2$ units with addition of 3 g of phosphonitrile chloride (PNCl). The mixture was chilled at $-5°$ C. to $+5°$ C. with agitation and 12 g of water were added dropwise thereto over a period of 1 hour. After 2 hours from completion of the dropwise addition of water, a 30 g portion of water was added to the mixture which was further agitated for 5 hours at 10° to 20° C. followed by neutralization by adding sodium hydrogen carbonate. Replacement of the solvent in the mixture with toluene and filtration gave 124.2 g of an organopolysiloxane expressed by the unit formula $[H(CH_3)_2SiO_{0.5}]_{0.5}[(CH_3)_3SiO_{0.5}]_{0.5}[SiO_2]$. The yield was about 91% of the theoretical value.

EXAMPLE 7.

A mixture composed of 324.8 g (2.0 moles) of hexamethyl disiloxane, 52.2 g (1.0 mole) of methyl silicate and 40 g (2.2 moles) of water was passed through a column of 600 ml capacity filled with 340 g of a cation exchange resin containing sulfonic acid groups (Amberlyst 15, a product of Rohm & Haas Co.) at a velocity of 120 g/hour per liter of the effective volume of the column at a temperature of 20° to 50° C. The mixture was kept under continuous agitation just until introduction to the column since the mixture was not a uniform mixture. A liquid product was obtained at a rate of 120 g/hour.

According to the results of the gas chromatographic analysis, the reaction mixture discharged out of the column was composed of: 1.2% by weight of water; 22.1% by weight of methyl alcohol; 3.3% by weight of hexamethyl disiloxane; 2.9% by weight of $[(CH_3)_3SiO_{0.5}]_2[SiO_2][(CH_3)][(CH_3)_2O_{0.5}]$; 14.1% by weight of $[(CH_3)_3SiO_{0.5}]_3[SiO_2][(CH_3)][(CH_3)_2O_{0.5}]$; 52.9% by weight of $[(CH_3)_3SiO_{0.5}]_4[SiO_2]$ and 3.5% by weight of a mixture of dimers and trimers. The dimer and trimer here implied are the compounds having, in a molecule, two or three tetrafunctional units $SiO_2$, respectively.

EXAMPLE 8.

A mixture composed of 93.2 g (0.5 mole) of 1,3-divinyl-1,1,3,3-tetramethyl disiloxane, 81.2 g (0.5 mole) of hexamethyl disiloxane, 150 g of a partial hydrolysis product of ethyl silicate (Polyethyl Silicate 40, a product of Colcoat Co.) corresponding to 1.0 mole of the $SiO_2$ units, and 54 g (3.0 moles) of water was passed through a column filled with the same cation exchange resin as used in Example 7 to make up an effective volume of 800 ml at a velocity of 150 g/hour per liter of the effective volume at 20° to 25° C. After running for 190 minutes carried out in this manner, 218.0 g of an organopolysiloxane product were obtained. This yield was about 93.0% of the theoretical value.

Analysis of the reaction mixture discharged out of the column gave a result that the organopolysiloxane could be expressed by the unit formula

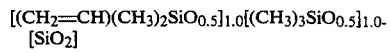

$[(CH_2=CH)(CH_3)_2SiO_{0.5}]_{1.0}[(CH_3)_3SiO_{0.5}]_{1.0}[SiO_2]$ and the reaction mixture contained 1,3-divinyl-1,1,3,3-tetramethyl disiloxane and hexamethyl disiloxane as unreacted in amounts corresponding to 0.9% and 0.3%, respectively, of the respective amounts contained in the feed to the column.

EXAMPLE 9.

A mixture composed of 81.2 g (0.5 mole) of hexamethyl disiloxane, 150 g of the same partial hydrolysis product of ethyl silicate as used in Example 8, 60 g (1.3 moles) of ethyl alcohol and 54 g (3.0 moles) of water was passed through a column of 1200 ml capacity filled with 1070 g of Nafion NR50 at a velocity of 100 g/hour per liter of the effective volume at 20° to 25° C. Running carried out for 170 minutes in this manner gave 133.5 g of an organopolysiloxane product. Analysis of the reaction mixture discharged out of the column showed that 0.2% of the hexamethyl disiloxane in the feed remained as unreacted. The organopolysiloxane product could be expressed by the unit formula $[(CH_3)SiO_{0.5}]_{1.0}[SiO_2]$ and the residual content of alkoxy groups was 0.03 mole per 100 g of the organopolysiloxane.

EXAMPLE 10.

A mixture composed of 134.2 g (1.0 mole) of 1,1,3,3-tetramethyl disiloxane, 208.3 g (1.0 mole) of ethyl silicate and 72.0 g (4.0 moles) of water was passed through a column filled with the same cation exchange resin as used in Example 7 to make up an effective volume of 800 ml at a velocity of 120 g/hour per liter of the effective volume at 10° to 15° C. The reaction mixture discharged out of the column contained 191.0 g of an organopolysiloxane corresponding to 97.4% of the theoretical value. The reaction mixture contained unreacted 1,1,3,3-tetramethyl disiloxane in an amount corresponding to 0.4% of the amount in the feed. The organopolysiloxane product could be expressed by the average unit formula $[H(CH_3)_2SiO_{0.5}]_{2.0}[SiO_2]$ and the residual content of the alkoxy groups was 0.02 mole per 100 g of the organopolysiloxane.

EXAMPLE 11.

A mixture composed of 81.2 g (0.5 mole) of hexamethyl disiloxane, 53.7 g (0.4 mole) of 1,1,3,3-tetramethyl disiloxane, 117.6 g of the same partial hydrolysis product of methyl silicate as used in Example 6 corresponding to 1.0 mole of the $SiO_2$ units and 36 g (2.0 moles) of water was passed through the same column filled with Nafion NR50 as used in Example 9 at a velocity of 120 g/hour per liter of the effective volume at 10° to 15° C. Running for 190 minutes carried out in this manner gave 191.0 g of an organopolysiloxane corresponding to 97% of the theoretical yield. The reaction mixture discharged out of the column contained unreacted hexamethyl disiloxane and 1,1,3,3-tetramethyl disiloxane in amounts corresponding to 0.3% and 0.2%, respectively, of the amounts in the feed. The organopolysiloxane product could be expressed by the average unit formula $[(CH_3)_3SiO_{0.5}]_{1.0}[H(CH_3)_2SiO_{0.5}]_{0.8}[SiO_2]$.

What is claimed is:

1. A method for the preparation of an organopolysiloxane containing tetrafunctional siloxane units and monofunctional siloxane units which comprises:
reacting an alkyl orthosilicate or a partial hydrolysis product thereof with an oligomeric organopolysiloxane having at least one monofunctional siloxane unit represented by the general formula $R_3SiO_{0.5}$, in which R is a hydrogen atom or a monovalent hydrocarbon group, in the presence of a catalytic compound selected from the group consisting of a sulfonic acid group-containing compounds and phosphonitrile compounds.

2. The method for the preparation of an organopolysiloxane as claimed in claim 1 wherein the catalytic compound is selected from the group consisting of sulfuric acid, sulfurous acid, fuming sulfuric acid, p-toluene sulfonic acid, acid clay, trifluoromethane sulfonic acid and sodium hydrogen sulfate.

3. The method for the preparation of an organopolysiloxane as claimed in claim 1 wherein the catalytic compound is a sulfonic acid group-containing cation exchange resin.

4. The method for the preparation of an organopolysiloxane as claimed in claim 2 wherein the reaction is conducted in the presence of water in an amount in the range from 0.6 to 1.5 moles per mole of the alkoxy groups in the alkyl orthosilicate or a partial hydrolysis product thereof.

5. The method for the preparation of an organopolysiloxane as claimed in claim 3 wherein the reaction is conducted in the presence of water in an amount in the range from 0.6 to 3.0 moles per mole of the alkoxy groups in the alkyl orthosilicate or a partial hydrolysis product thereof.

6. The method for the preparation of an organopolysiloxane as claimed in claim 2 wherein the amount of the catalytic compound is in the range from 0.001 to 3% by weight based on the overall amount of the alkyl orthosilicate or a partial hydrolysis product thereof and the oligomeric organopolysiloxane.

7. The method for the preparation of an organopolysiloxane as claimed in claim 3 wherein the reaction mixture composed of the alkyl orthosilicate or a partial hydrolysis product thereof and the oligomeric organopolysiloxane is admixed with the catalytic compound in an amount of at least 5% by weight based on the overall amount of the alkyl orthosilicate of a partial hydrolysis product thereof and the oligomeric organopolysiloxane.

8. The method for the preparation of an organopolysiloxane as claimed in claim 3 wherein the reaction mixture composed of the alkyl orthosilicate or a partial hydrolysis product thereof and the oligomeric organopolysiloxane is passed through a bed of the catalytic compound.

9. The method for the preparation of an organopolysiloxane as claimed in claim 1 wherein the reaction is conducted in the presence of water and at a temperature which initially is from 0° to 25° C.

10. The method for the preparation of an organosiloxane as claimed in claim 1 wherein the starting oligomeric organopolysiloxane is hexamethyl disiloxane, 1,1,3,3-tetramethyl disiloxane, 1,3-divinyl-1,1,3,3-tetramethyl disiloxane, decamethyl tetrasiloxane, octamethyl cyclotetrasiloxane or a mixture thereof and the starting alkyl orthosilicate is methyl silicate, ethyl silicate, a partial hydrolysis product of either or a mixture thereof.

11. The method for the preparation of an organopolysiloxane as claimed in claim 10 wherein the catalytic compound is a sulfonic acid group-containing compound selected from the group consisting of sulfuric acid, sulfurous acid, fuming sulfuric acid, p-toluene sulfonic acid, acid clay, trifluoromethane sulfonic acid and sodium hydrogen sulfate and wherein the reaction is conducted in the presence of water and at a temperature which initially is from 0° to 25° C.

12. The method for the preparation of an organopolysiloxane as claimed in claim 10 wherein the catalytic compound is a sulfonic acid group-containing cation exchange resin and wherein the reaction is conducted in the presence of water.

13. A method for the preparation of an organopolysiloxane as claimed in claim 1 wherein R is a hydrogen atom or an alkyl, alkenyl, cycloalkyl or aryl group and the catalytic compound is selected from the group consisting of sulfuric acid, sulfurous acid, fuming sulfuric acid, p-toluene sulfonic acid, acid clay, trifluoromethane sulfonic acid, sodium hydrogen sulfate and phosphonitrile compounds.

* * * * *